(12) United States Patent
Kishida et al.

(10) Patent No.: US 10,155,191 B2
(45) Date of Patent: Dec. 18, 2018

(54) GRID AND CANISTER USING THE GRID

(71) Applicant: FUTABA INDUSTRIAL CO., LTD., Okazaki-shi, Aichi (JP)

(72) Inventors: Yosuke Kishida, Okazaki (JP); Shogo Minezawa, Okazaki (JP)

(73) Assignee: FUTABA INDUSTRIAL CO., LTD., Okazaki-Shi, Aichi (JP)

(*) Notice: Subject to any disclaimer, the term of this patent is extended or adjusted under 35 U.S.C. 154(b) by 82 days.

(21) Appl. No.: 15/113,666

(22) PCT Filed: Jan. 23, 2015

(86) PCT No.: PCT/JP2015/051853
§ 371 (c)(1),
(2) Date: Jul. 22, 2016

(87) PCT Pub. No.: WO2015/111704
PCT Pub. Date: Jul. 30, 2015

(65) Prior Publication Data
US 2017/0001141 A1  Jan. 5, 2017

(30) Foreign Application Priority Data
Jan. 23, 2014 (JP) .................. 2014-010369

(51) Int. Cl.
*F02M 25/08* (2006.01)
*B01D 53/04* (2006.01)

(52) U.S. Cl.
CPC ..... *B01D 53/0446* (2013.01); *B01D 53/0415* (2013.01); *F02M 25/0854* (2013.01); *B01D 2253/102* (2013.01); *B01D 2257/702* (2013.01); *B01D 2259/4516* (2013.01); *F02M 25/0836* (2013.01)

(58) Field of Classification Search
CPC .......... B01D 53/0415; B01D 53/0446; B01D 2253/102; B01D 2257/702; B01D 2259/4516; F02M 25/0836; F02M 25/0854
USPC ................ 96/137, 139, 149, 152; 123/519
See application file for complete search history.

(56) References Cited

U.S. PATENT DOCUMENTS

| | | |
|---|---|---|
| 4,430,099 A | 2/1984 | Yanagisawa et al. |
| 4,598,686 A | 7/1986 | Lupoli et al. |
| 5,645,036 A | 7/1997 | Matsumoto et al. |

(Continued)

FOREIGN PATENT DOCUMENTS

| | | |
|---|---|---|
| JP | S5583245 U | 6/1980 |
| JP | S5748324 A | 3/1982 |

(Continued)

OTHER PUBLICATIONS

Notice of Reason(s) for Rejection for Japanese Patent Application No. 2015-559132 dated Jun. 6, 2017 (5 pages including English language translation).

(Continued)

*Primary Examiner* — Frank M Lawrence, Jr.
(74) *Attorney, Agent, or Firm* — Withrow & Terranova, P.L.L.C.; Vincent K. Gustafson

(57) ABSTRACT

A grid that includes a plurality of holes perforated therein such that an aperture ratio of the grid increases from the center toward the periphery of the grid. The grid holds adsorbents filled inside a filling chamber of a canister having an opening, and keeps the adsorbents inside the filling chamber.

13 Claims, 8 Drawing Sheets

(56) References Cited

U.S. PATENT DOCUMENTS

| | | | |
|---|---|---|---|
| 7,008,470 B2* | 3/2006 | Makino | B01D 53/02 123/519 |
| 7,294,179 B2* | 11/2007 | Kim | B01D 53/0415 123/519 |
| 9,764,271 B2* | 9/2017 | Kim | B01D 53/0423 |
| 2001/0039881 A1* | 11/2001 | Moriyama | B01D 53/0415 96/139 |
| 2005/0022796 A1 | 2/2005 | Zuchara | |
| 2013/0327303 A1 | 12/2013 | Arase et al. | |
| 2014/0165843 A1* | 6/2014 | Omichi | B01D 53/0446 96/144 |
| 2016/0076490 A1* | 3/2016 | Makino | F02M 25/089 123/519 |

FOREIGN PATENT DOCUMENTS

| | | | |
|---|---|---|---|
| JP | S61-226554 A | | 10/1986 |
| JP | S61-181862 U | | 11/1986 |
| JP | H08114159 A | | 5/1996 |
| JP | H08135524 A | | 5/1996 |
| JP | 2008095556 A | | 4/2008 |
| JP | 2011-169219 | * | 9/2011 |
| JP | 2013253569 A | | 12/2013 |

OTHER PUBLICATIONS

Notification of Transmittal of Translation of IPRP, and Translation of International Preliminary Report on Patentability (Chapter II of the Patent Cooperation Treaty) (Forms PCT/IB/338 and PCT/IPEA/409) for International Patent Application No. PCT/JP2015/051853 dated Jul. 28, 2016 (6 pages).

International Preliminary Report on Patentability (Chapter II of the Patent Cooperation Treaty) (Form PCT/IPEA/409) for International Patent Application No. PCT/JP2015/051853 dated Apr. 22, 2016 (6 pages).

Written Opinion (Form PCT/ISA/237) for International Patent Application No. PCT/JP2015/051853 dated Apr. 21, 2015, 5 pages.

Translation of International Search Report (Form PCT/ISA/210) for International Patent Application No. PCT/JP2015/051853 dated Apr. 21, 2015, 2 pages.

Partial Machine Translation of Written Opinion (Form PCT/ISA/237) for International Patent Application No. PCT/JP2015/051853 dated Apr. 21, 2015, 4 pages.

Notification of the First Office Action for Chinese Patent Application No. 201580005485.6 dated Jan. 2, 2018 (11 pages including English language translation).

Notification of Reasons for Refusal for Japanese Patent Application No. 2015-559132 dated Nov. 21, 2017 (8 pages including English language translation).

Notification of Reasons of Refusal for Japanese Patent Application No. 2015-559132 dated May 22, 2018 (7 pages including English language translation).

Notification of the Second Office Action for Chinese Patent Application No. 201580005485.6 dated Jul. 23, 2018 (11 pages including English language translation).

* cited by examiner

GRID AND CANISTER USING THE GRID

CROSS-REFERENCE TO RELATED APPLICATIONS

This application is a 35 U.S.C. § 371 national phase filing of International Application No. PCT/JP2015/051853, filed Jan. 23, 2015, and claims the benefit of Japanese Patent Application No. 2014-10369 filed Jan. 23, 2014 in the Japan Patent Office. The entire disclosures of International Application No. PCT/JP2015/051853 and Japanese Patent Application No. 2014-10369 are incorporated by reference herein in their respective entireties.

TECHNICAL FIELD

The present invention relates to a grid that holds adsorbents inside a filling chamber and also relates to a canister that uses the grid.

BACKGROUND ART

As shown in FIG. 1, a canister 1 comprises a case 1a that has two spaces which define a first chamber 10 and a second chamber 20. The first chamber 10 and the second chamber 20 are partitioned by a partition wall 1b. Bottoms of the first chamber 10 and the second chamber 20 have openings. However, these openings are closed by a bottom cap 1c. The bottom cap 1c has a groove that forms a communication hole α which communicates the first chamber 10 and the second chamber 20 when the openings of the bottoms of the first chamber 10 and the second chamber 20 are closed.

A charging port 11 and a purging port 12 are disposed to stand upward at a ceiling of a portion of the case 1a that forms the first chamber 10. The charging port 11 and the purging port 12 are disposed side by side along the direction in which the first chamber 10 and the second chamber 20 are arranged, and are communicated with the first chamber 10. The charging port 11 is coupled to a fuel tank; the purging port 12 is coupled to an inlet pipe of an internal combustion engine via a purge valve.

When viewed from the ceiling towards a lower side of the first chamber 10, a filter 13, adsorbents 14, a filter 15, and a grid 16 are layered and stored in this order inside the first chamber 10. A spring 17 is fixed on an upper surface of the bottom cap 1c at its portion for closing the first chamber 10, and an upper end of the spring 17 is in contact with the grid 16. Thus, the grid 16 is pushed upward by a biasing force of the spring 17 when the bottom cap 1c closes the chamber 10. Thereby, the filter 13, the adsorbents 14, and the filter 15 are interposed between the ceiling of the first chamber 10 and the grid 16, and stored inside the first chamber 10. In this manner, the grid 16 keeps the adsorbents 14 being filled inside the first chamber 10. Note that the adsorbents 14 are aggregates of granular activated carbon.

An atmosphere port 21 is disposed to stand upward on a ceiling of a portion of the case 1a that forms the second chamber 20. The atmosphere port 21 is communicated with the second chamber 20.

When viewed from the ceiling towards a lower side of the second chamber 20, a filter 23, adsorbents 24, a filter 25, and a grid 26 are layered and stored in this order inside the second chamber 20. A spring 27 is fixed on an upper surface of the bottom cap 1c at a portion for closing the second chamber 20, and an upper end of the spring 27 is in contact with the grid 26. Thus, the grid 26 is pushed upward by a biasing force of the spring 27 when the bottom cap 1c closes the second chamber 20. Thereby, the filter 23, the adsorbents 24, and the filter 25 are interposed between the ceiling of the second chamber 20 and the grid 26, and stored inside the second chamber 20. Note that the adsorbents 24 are aggregates of granular activated carbon.

Function of the canister 1 is explained next using FIG. 2A and FIG. 2B. When an internal combustion engine is not in operation and an automobile is stopped, evaporated fuel generated in a fuel tank or the like is introduced into the first chamber 10 from the charging port 11 through the filter 13 along with air, and is adsorbed by the adsorbents 14 stored inside the first chamber 10 as shown in FIG. 2A. Evaporated fuel that is not adsorbed by the adsorbents 14 inside the first chamber 10 is introduced into the second chamber 20 through the filter 15, the communication hole α, and the filter 25 along with air and adsorbed by the adsorbents 24 stored inside the second chamber 20. Air that contains reduced amount of evaporated fuel is discharged to the atmosphere from the atmosphere port 21 via the filter 23.

When the internal combustion engine is in operation, air in the atmosphere is introduced into the second chamber 20 from the atmosphere port 21 via the filter 23 as shown in FIG. 2B, and the fuel is desorbed from the adsorbents 24 of the second chamber 20. Moreover, air that contains evaporated fuel is guided to the first chamber 10 from the second chamber 20 via the communication hole α and the filter 15; and the fuel is desorbed from the adsorbents 14 inside the first chamber 10, and the air that contains the fuel is discharged to the inlet pipe via the purging port 12 and the purge valve (not shown) and combusted in the internal combustion engine. Such process of desorbing the fuel from the adsorbents 14 and the adsorbents 24 during the operation of the internal combustion engine is generally called purging.

SUMMARY OF THE INVENTION

Problems to be Solved by the Invention

Meanwhile, since purging is performed by utilizing a negative pressure in the internal combustion engine, air introduced from the atmosphere port 21 travels inside the canister 1 at high speed. As shown in FIG. 8, a punching metal that is a disc evenly studded with a plurality of holes is used as the grid 16, 26. Analysis of an air flow inside the second chamber 20, where the grid 26 is used, indicates that a fast air flow is seen at the center of the second chamber 20 and a slow air flow is seen at a periphery of the second chamber 20 as shown in FIG. 5B.

If the flows at the center and at the periphery are different from each other as mentioned above, then it becomes difficult to perform sufficient desorption of the fuel at the periphery inside the second chamber 20; thus, purging efficiency of the canister tends to decrease compared with a case where air flows evenly over the entire chamber.

As one aspect of the invention of the present application, it is desirable to provide a grid that is capable of improving the purging efficiency, and a canister that uses such a grid.

Means for Solving the Problems

One aspect of the invention of the present application is a grid that holds adsorbents filled inside a filling chamber having an opening, and keeps the adsorbents inside the filling chamber. The grid is perforated with a plurality of holes such that an aperture ratio of the grid increases from a center toward a periphery of the grid.

As a result of an experiment, it was confirmed that, when this grid is used, the difference in speed of air that flows through the adsorbents has become smaller between the air flowing through the center of the adsorbents and the air flowing through the outside of the adsorbents compared with that in a case with the grid mentioned in the Background Art.

Thus, when this grid is used, the purging efficiency can be improved compared with a case where a grid that comprises a punching metal, which is a disc evenly studded with a plurality of holes, is used.

The grid may be of any shape; nevertheless, a grid that is perforated with holes, which are a plurality of small holes around its center and a plurality of large holes along its peripheral edge outside the area perforated with the small holes, may be used as in the second aspect of the invention of the present application.

As in the third aspect of the invention of the present application, a grid may be perforated with holes arranged radially from the center of the grid; and the closer a hole is to the center, the smaller the hole may be. As in the fourth aspect of the invention of the present application, the aperture ratio at the center of a grid may be zero.

Likewise a canister in the fifth aspect of the invention of the present application, if the adsorbents inside the filling chamber are held by using a grid of any one of the first to the third aspect of the invention of the present application, then a canister with high purging efficiency can be provided.

BRIEF DESCRIPTION OF THE DRAWINGS

An exemplary embodiment of the present invention is described hereinafter with reference to the drawings.

EXPLANATION OF REFERENCE NUMERALS

Figure 1:
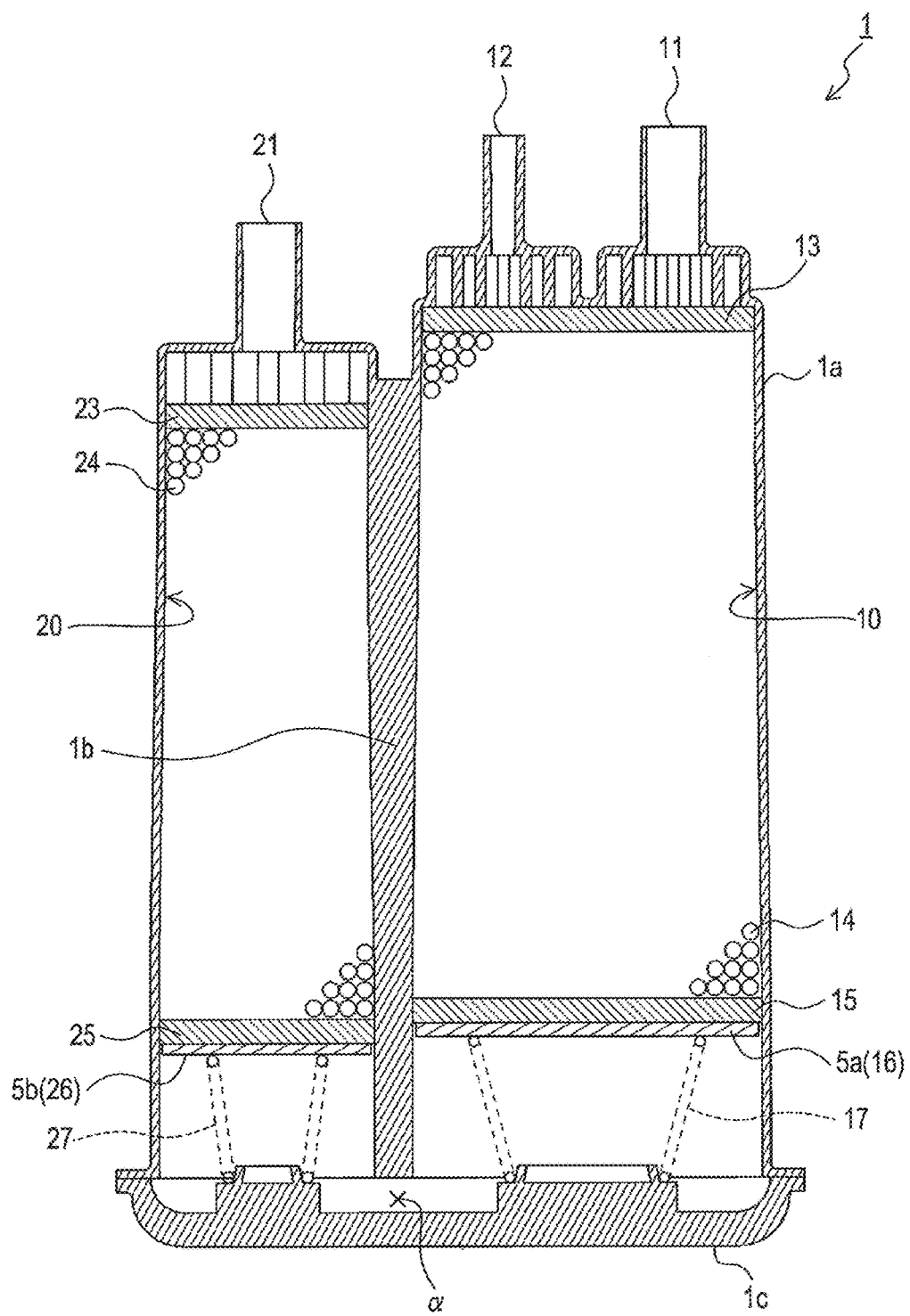
FIG. 1 is a diagram of an inner structure of a canister in a background art and in an embodiment of the present application.
Figure 2A:
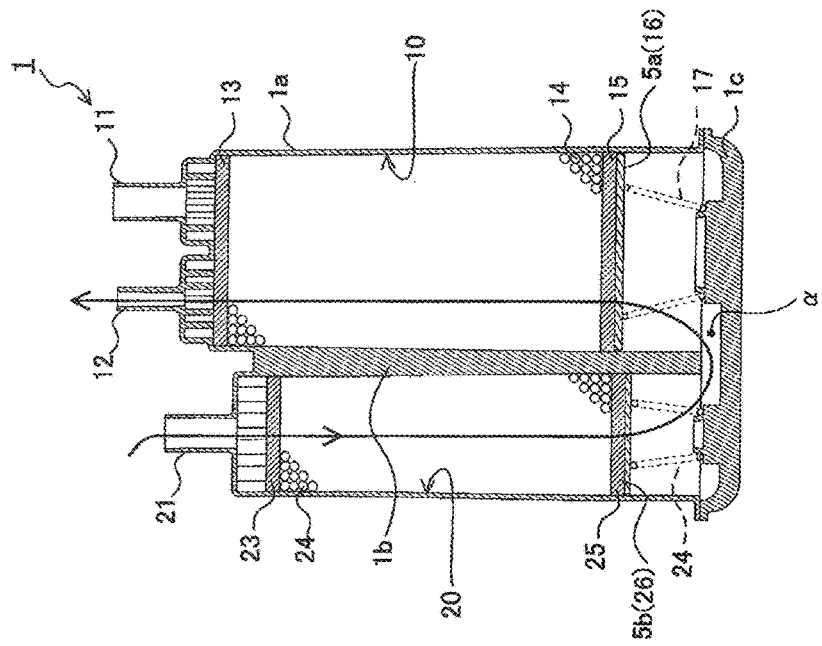
FIG. 2A is an explanatory drawing for explaining a passing route of evaporated fuel that flows inside the canister in the background art and in the embodiment of the present application; it is an explanatory drawing for at a time of adsorption.
Figure 2B:
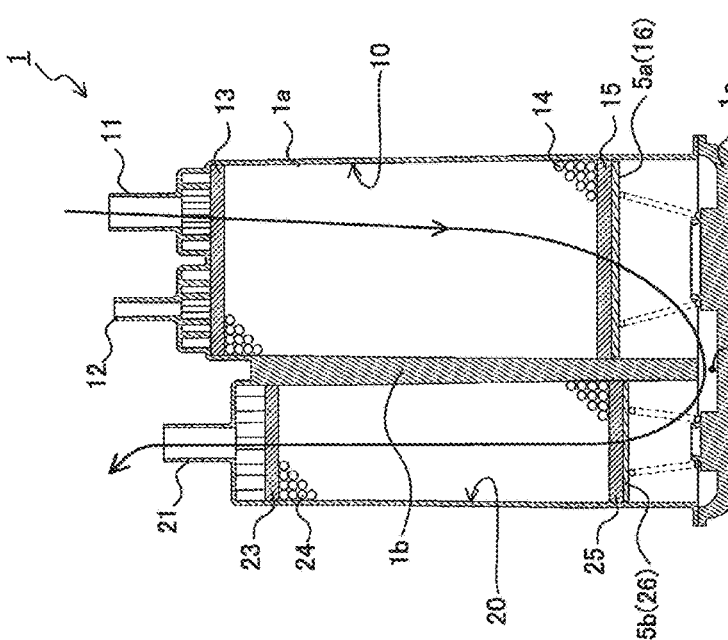
FIG. 2B is an explanatory drawing for explaining a passing route of evaporated fuel that flows inside the canister in the background art and in the embodiment of the present application; it is an explanatory drawing for at a time of desorption.

1 ... canister, 1a ... case, 1b ... partition wall, 1c ... bottom cap, 5a ... grid, 5b ... grid, 10 ... first chamber, 11 ... charging port, 12 ... purging port, 13 ... filter, 14 ... adsorbents, 15 ... filter, 16 ... grid, 17 ... spring, 20 ... second chamber, 21 ... atmosphere port, 23 ... filter, 24 ... adsorbents, 25 ... filter, 26 ... grid, 27 ... spring, 50 ... small holes, 52 ... large holes, CL ... central part.

MODE FOR CARRYING OUT THE INVENTION

Note that an explanation of grids 5a and 5b of the embodiment of the present application that are used in a canister 1 will not be repeated since the canister 1 has already been explained in the background art section; and identical configurations will be described with identical reference numerals.

Figure 3:
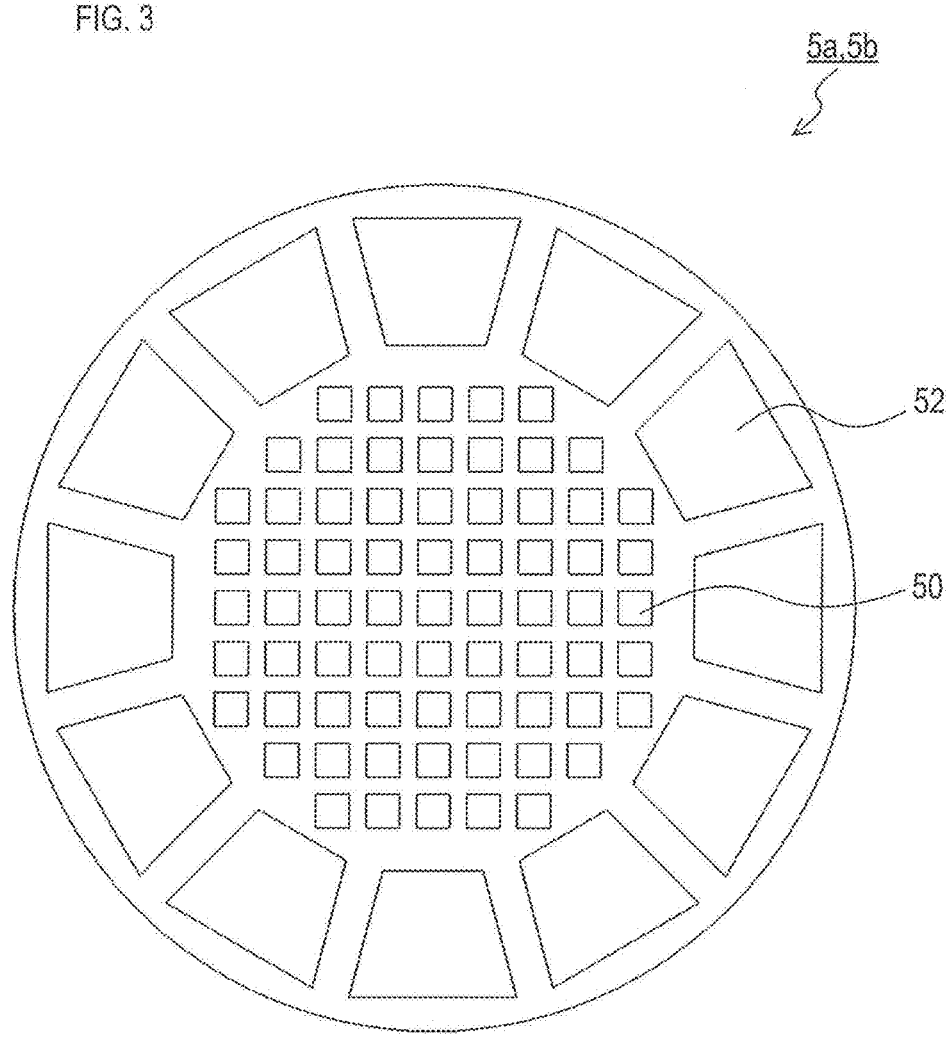
FIG. 3 is a plan view of a grid of the embodiment of the present application.

As shown in FIG. 3, the grids 5a and 5b used in the canister 1 of the embodiment of the present application are perforated with a plurality of small holes 50 around their centers; and are perforated with a plurality of large holes 52 around the area perforated with these small holes 50 and along the peripheral edges of the grids 5a and 5b.

Figure 4:
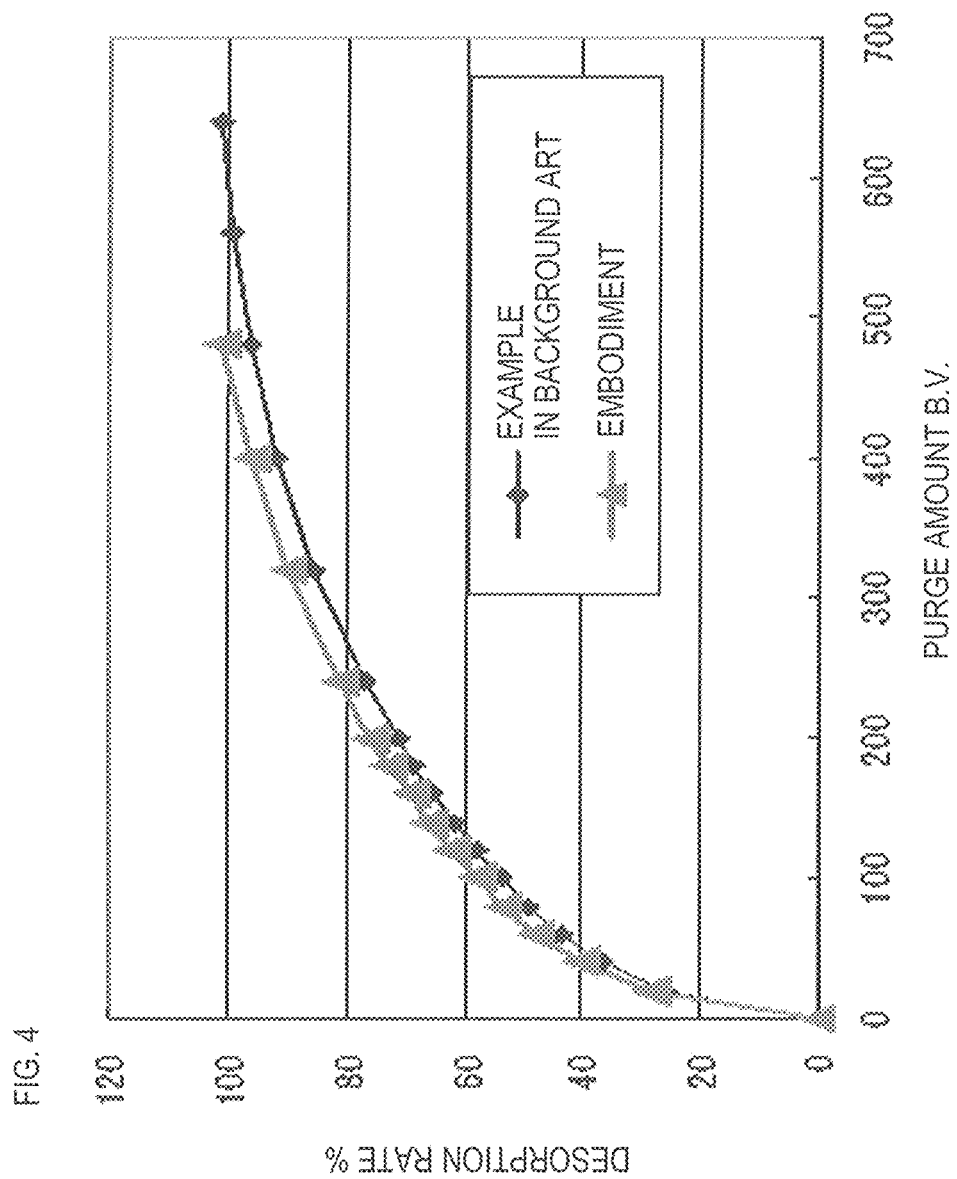
FIG. 4 is a purge amount/desorption rate graph of a case in which the grid of the present application is used.

It can be seen, as shown in FIG. 4, that desorption rate in relation to purge amount is improved at any purge amount when these grids 5a and 5b are attached to the canister 1. Note that the unit for purge amount is Bed Volume, which is measured by dividing air-volume by amount of adsorbents.

Figure 5A:
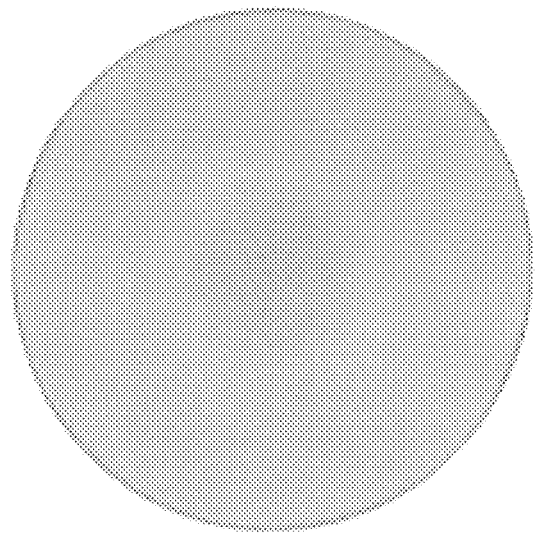
FIG. 5A is a schematic diagram that shows measurement results of flow amount inside the canister provided with the grid of the embodiment of the present application.
Figure 5B:
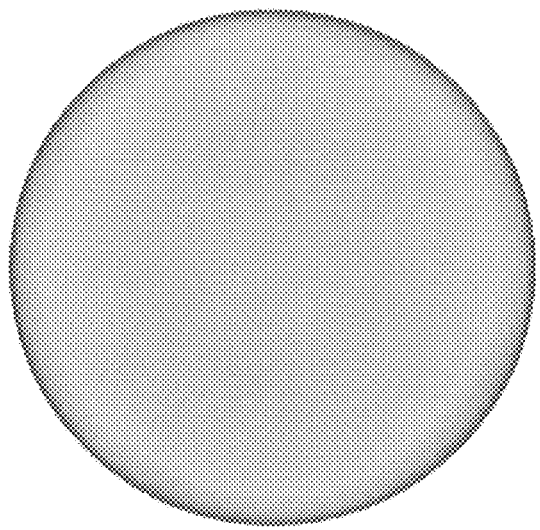
FIG. 5B is a schematic diagram that shows measurement results of flow amount inside the canister provided with a grid of a comparative example.

This is assumed to be on account of the air flowing inside the second chamber 20 being substantially constant regardless of whether it flows through the center or through the periphery of the second chamber 20. In FIG. 5A and FIG. 5B, the darker the color is, the slower the air flows; and the lighter the color is, the faster the air flows. In a case of a canister of a comparative example provided with the grid 16 and the grid 26 that comprise punching metals, which are discs evenly studded with a plurality of holes, the color is darker at the periphery as shown in FIG. 5B. However, as shown in FIG. 5A, in a case of the canister 1 provided with the grid 5a and the grid 5b of the embodiment of the present application, the darkness of the color at the center and at the periphery are approximately the same.

Therefore, the purging efficiency can be improved in a case where the grid 5a and the grid 5b of the embodiment of the present application are used, compared with a case where the grid 16 and the grid 26 of the comparative example are used.

Note that although an experiment was conducted on the second chamber 20, a similar effect can be expected from a first chamber 10 since the first chamber 10 has a similar configuration.

Figure 6C:
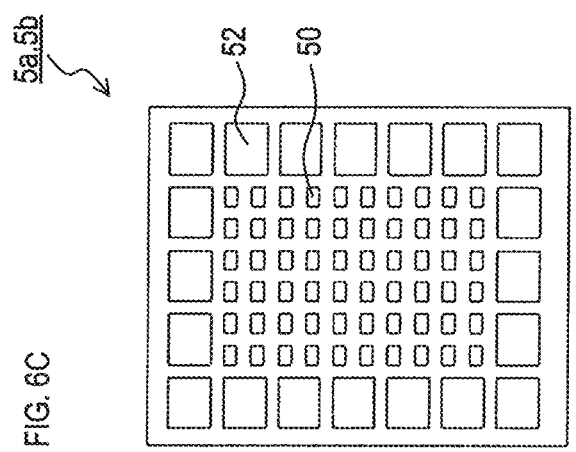
FIG. 6A to FIG. 6C are plan views of grids showing other embodiments.
Figure 6B:
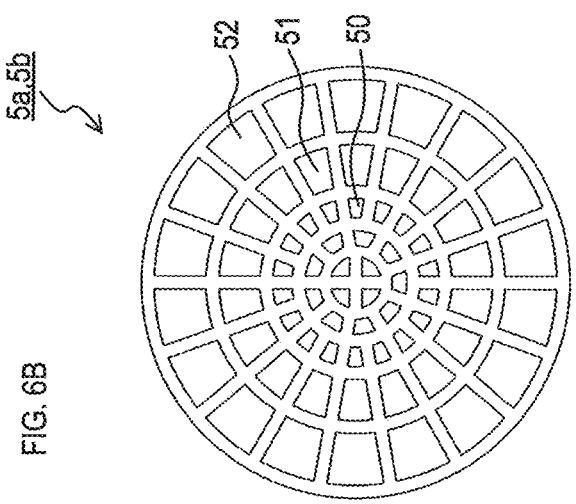
Figure 6A:
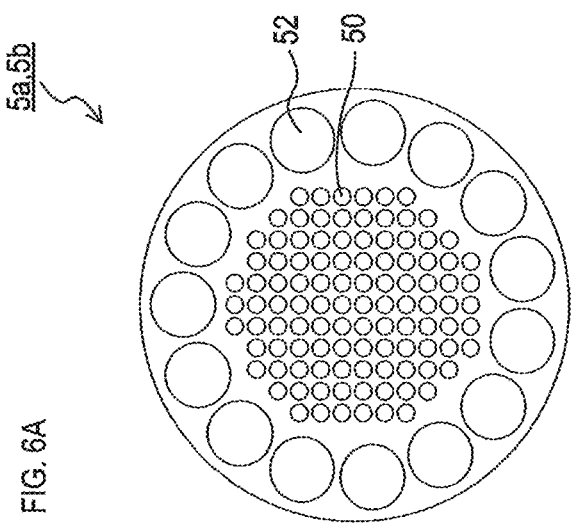

OTHER EMBODIMENTS (1) The canister 1 explained in the aforementioned embodiment is only an example and a canister 1 is not limited thereto. For example, both the small holes 50 and the large holes 52 are of a square shape in FIG. 3; nevertheless, both the small holes 50 and the large holes 52 may be of a round shape as shown in FIG. 6A.

(2) Aperture ratios of the grid 5a and the grid 5b may be any ratios as long as they are rendered by arranging a plurality of perforated holes such that the aperture ratios increase from the center toward the periphery of the grids. For example, the grid 5a and the grid 5b may comprise a plurality of holes radially arranged from the center of the grids, and the holes become smaller toward the center of the grids as shown in FIG. 6B.

The grid 5a and the grid 5b are not limited to those formed into a disc shape. They may be formed into some other shapes such as a square shape as shown in FIG. 6C.

Figure 7:
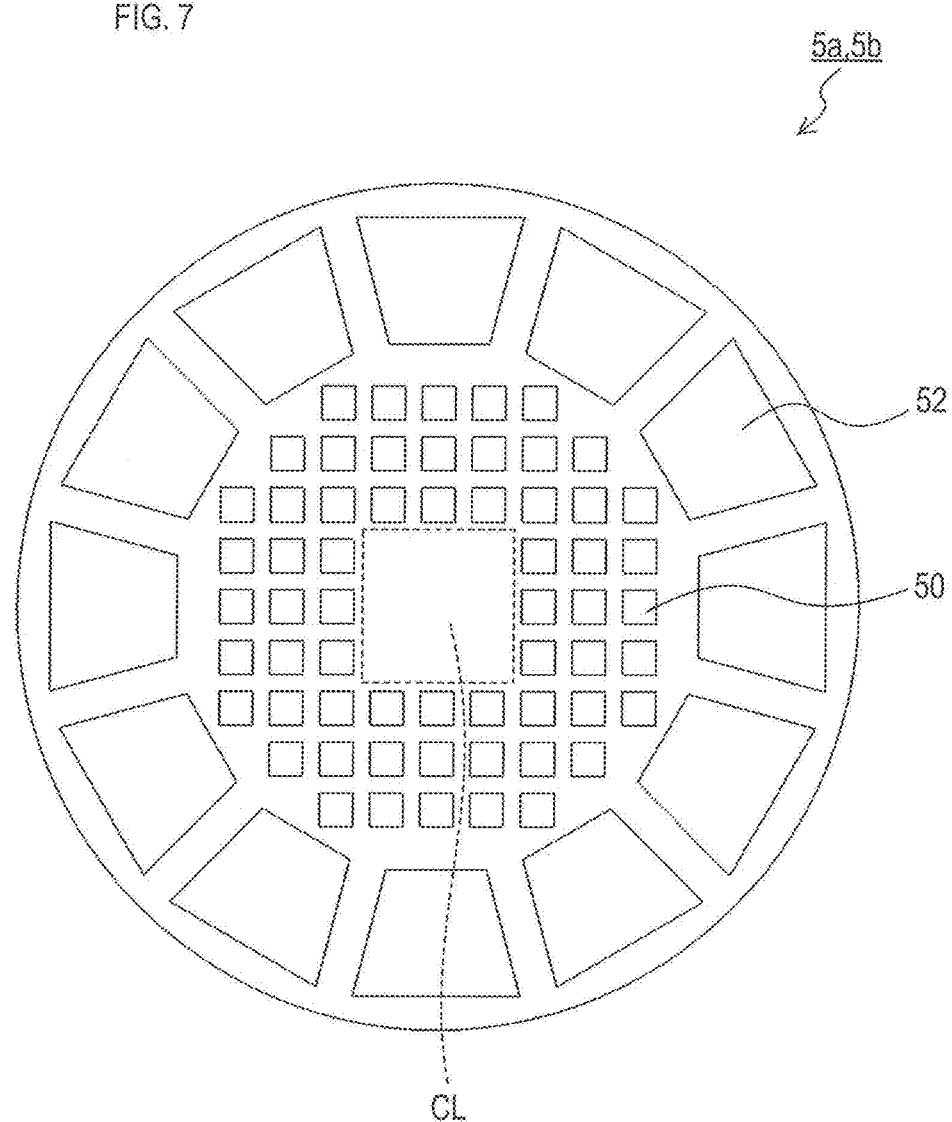
FIG. 7 is a plan view of a grid showing another embodiment.
Figure 8:
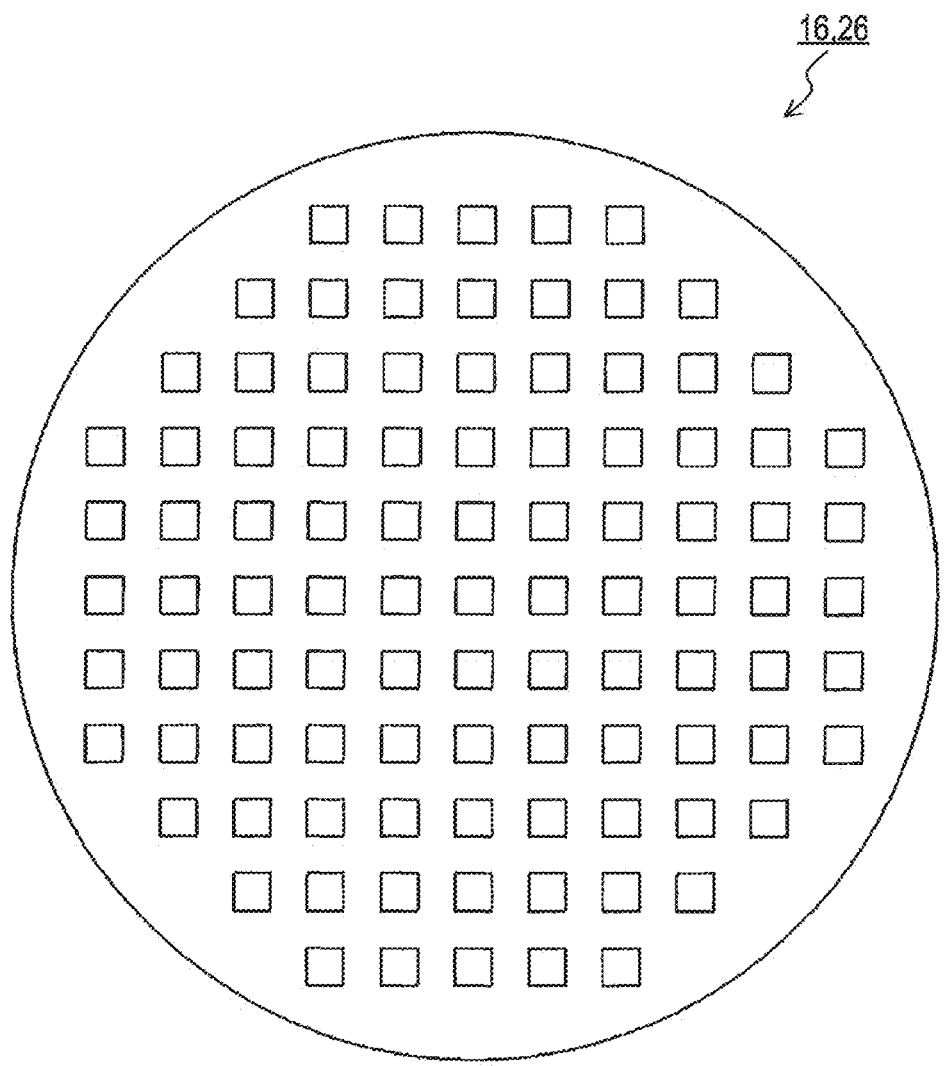
FIG. 8 is a plan view of the grid that is explained in the background art.

The grid 5a and the grid 5b may have a structure that has zero aperture ratio at the center CL, so that the center CL has no holes as shown in FIG. 7.

The invention claimed is:

1. A grid for use in a vaporized fuel adsorption canister, the grid comprising:
   a plate having a center and comprising a first aperture pattern and a second aperture pattern;
   the first aperture pattern comprising a first plurality of holes configured in an array of holes that are evenly distributed in two dimensions within a central region of the plate, the array of holes being centered on the center of the plate; and
   the second aperture pattern comprising a second plurality of holes distributed in a circular arrangement on a peripheral region of the plate;
   wherein the grid is configured to fit inside a vaporized fuel adsorption canister so as to retain adsorbent material contained within the vaporized fuel adsorption canister, and
   wherein:
      each hole of the first plurality of holes has a first open hole area;
      a ratio of aggregate first open hole area to total area of the central region comprises a first value;
      each hole of the second plurality of holes has a second open hole area;
      a ratio of aggregate second open hole area to total area of the peripheral region comprises a second value; and
      the second value is greater than the first value.

2. The grid according to claim 1, wherein the first aperture pattern is arranged such that the center of the plate is devoid of any hole of the first plurality of holes.

3. The grid according to claim 1, wherein each hole of the first plurality of holes is smaller than each hole of the second plurality of holes.

4. The grid according to claim 1, wherein the grid is round in shape.

5. A grid for use in a vaporized fuel adsorption canister, the grid comprising:
   a plate having a center and comprising a first aperture pattern and a second aperture pattern;
   the first aperture pattern comprising a first plurality of holes configured in an array of holes that are evenly distributed in two dimensions, the array of holes being centered on the center of the plate; and
   the second aperture pattern comprising a second plurality of holes distributed in a circular arrangement on a peripheral region of the plate;
   wherein the grid is configured to fit inside a vaporized fuel adsorption canister so as to retain adsorbent material contained within the vaporized fuel adsorption canister, and
   wherein each hole of the first plurality of holes has a shape that differs from each hole of the second plurality of holes.

6. A grid for use in a vaporized fuel adsorption canister, the grid comprising:
   a plate having a center and comprising a first aperture pattern and a second aperture pattern;
   the first aperture pattern comprising a first plurality of holes configured in an array of holes that are evenly distributed in two dimensions, the array of holes being centered on the center of the plate; and
   the second aperture pattern comprising a second plurality of holes distributed in a circular arrangement on a peripheral region of the plate;
   wherein the grid is configured to fit inside a vaporized fuel adsorption canister so as to retain adsorbent material contained within the vaporized fuel adsorption canister, and
   wherein the first plurality of holes comprises a greater number of holes than the second plurality of holes.

7. The grid according to claim 6, wherein the first aperture pattern is arranged such that the center of the plate is devoid of any hole of the first plurality of holes.

8. A vaporized fuel adsorption canister comprising:
   a filling chamber comprising a cavity configured to hold granular desorption material;
   a biasing member;
   a grid according to claim 1 arranged between the biasing member and the cavity, wherein the biasing member is arranged to exert a biasing force on the grid toward the cavity.

9. The vaporized fuel adsorption canister of claim 8, further comprising a filter bounding a portion of the cavity, wherein the grid is arranged between the biasing member and the filter.

10. A vaporized fuel adsorption canister comprising:
   a filling chamber comprising a cavity configured to hold granular desorption material;
   a biasing member;
   a grid according to claim 6 arranged between the biasing member and the cavity, wherein the biasing member is arranged to exert a biasing force on the grid toward the cavity.

11. The vaporized fuel adsorption canister of claim 10, further comprising a filter bounding a portion of the cavity, wherein the grid is arranged between the biasing member and the filter.

12. A vaporized fuel adsorption canister comprising:
   a filling chamber comprising a cavity configured to hold granular desorption material;
   a biasing member; and
   a grid according to claim 5 arranged between the biasing member and the cavity, wherein the biasing member is arranged to exert a biasing force on the grid toward the cavity.

13. The vaporized fuel adsorption canister of claim 12, further comprising a filter bounding a portion of the cavity, wherein the grid is arranged between the biasing member and the filter.

* * * * *